(12) United States Patent
Biallas

(10) Patent No.: US 6,699,153 B2
(45) Date of Patent: Mar. 2, 2004

(54) ELECTRICALLY-ACTUATED BRAKING CLUTCH FOR TRANSMISSION

(75) Inventor: Jeffrey J. Biallas, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/126,265

(22) Filed: Apr. 19, 2002

(65) Prior Publication Data

US 2003/0199356 A1 Oct. 23, 2003

(51) Int. Cl.[7] ............................................... F16H 48/06
(52) U.S. Cl. .................... 475/154; 188/72.1; 188/72.8; 475/282; 475/311
(58) Field of Search ................................. 475/154, 271, 475/282, 284, 286, 311, 323, 317; 188/70 B, 71.5, 71.9, 72.1, 72.8

(56) References Cited

U.S. PATENT DOCUMENTS

| | | | |
|---|---|---|---|
| 4,602,702 A | * 7/1986 | Ohta et al. ................... | 188/72.1 |
| 5,090,518 A | * 2/1992 | Schenk et al. .............. | 188/72.1 |
| 5,701,976 A | * 12/1997 | Kumagai et al. ........... | 188/71.5 |
| 5,829,557 A | * 11/1998 | Halasy-Wimmer et al. . | 188/162 |
| 5,879,264 A | * 3/1999 | Raghavan et al. ........... | 475/280 |
| 5,928,102 A | 7/1999 | Park .............................. | 475/286 |
| 5,951,434 A | 9/1999 | Richards et al. ............. | 475/284 |
| 6,074,323 A | * 6/2000 | Collins et al. ............... | 475/331 |
| 6,139,460 A | * 10/2000 | Drennen et al. ............ | 188/72.1 |
| 6,145,634 A | 11/2000 | Holding ....................... | 188/72.8 |
| 6,158,558 A | * 12/2000 | Bill et al. .................... | 188/162 |
| 6,189,661 B1 | * 2/2001 | Schaffer ...................... | 188/157 |
| 6,213,256 B1 | 4/2001 | Schaffer ...................... | 188/71.9 |
| 6,230,855 B1 | 5/2001 | Holding ....................... | 188/158 |
| 6,257,377 B1 | * 7/2001 | Schumann ................... | 188/72.8 |
| 6,257,855 B1 | 7/2001 | Kameya et al. ........... | 418/201.3 |
| 6,305,508 B1 | * 10/2001 | Schumann ................... | 188/72.8 |
| 6,315,092 B1 | 11/2001 | Schwarz ...................... | 188/265 |
| 6,349,801 B1 | * 2/2002 | Koth et al. ................. | 188/72.8 |
| 6,397,981 B1 | * 6/2002 | Tamasho et al. ........... | 188/71.9 |
| 6,491,140 B2 | * 12/2002 | Usui et al. .................. | 188/72.1 |
| 2003/0078126 A1 | * 4/2003 | Holmes et al. ................ | 475/5 |

FOREIGN PATENT DOCUMENTS

JP         59026632 A    * 2/1984    ........... F16D/55/04

* cited by examiner

Primary Examiner—Rodney H. Bonck
Assistant Examiner—David D. Le
(74) Attorney, Agent, or Firm—Leslie C. Hodges

(57) ABSTRACT

A braking clutch is provided for a transmission which includes a transmission housing and a plurality of planetary gear members. The braking clutch includes a floating caliper movably supported on the transmission housing. An apply hub is actuated by an electric motor. A rotor is operatively connected to one of the planetary gear members and has a portion extending between the floating caliper and the apply hub to enable selective braking of rotation of the rotor by frictionally engaging the portion of the rotor between the floating caliper and apply hub, thereby braking rotation of the planetary gear member.

9 Claims, 6 Drawing Sheets

ELECTRICALLY-ACTUATED BRAKING CLUTCH FOR TRANSMISSION

TECHNICAL FIELD

The present invention relates to an electrically-actuated braking clutch for a transmission in which a floating caliper and apply hub are actuated by an electric motor to selectively brake rotation of a rotor connected to a planetary gear member.

BACKGROUND OF THE INVENTION

Automatic transmissions often include a braking clutch which selectively engages a planetary gear member with the transmission housing by means of a clutch pack which includes stationary and driven friction plates. The driven and stationary friction plates are alternately arranged, and a piston is reciprocally moved toward and away from the friction plates within a cylindrical portion formed by a clutch drum or a casing. An oil pressure chamber is formed on the back side of the piston, and a return spring is arranged on the front side of the piston. The piston is moved back and forth to apply/release the frictional engagement device by feeding/releasing the oil pressure in the oil pressure chamber via an oil passage.

Accordingly, typical transmission brake assemblies require high pressure hydraulic apply oil, pistons, piston return springs, control valves, and appropriate hydraulic channeling to facilitate transmission speed changes.

It is desirable to provide an improved transmission brake in which manufacturing costs may be reduced and braking efficiency may be enhanced.

SUMMARY OF THE INVENTION

The present invention provides an electric motor-actuated disc brake transmission clutch which includes a floating caliper and apply hub which are actuated by the electric motor to selectively brake rotation of a rotor which is connected to a planetary gear member in a transmission.

More specifically, the invention provides a braking clutch for a transmission which includes a transmission housing and a plurality of planetary gear members. The braking clutch includes a floating caliper movably supported on the transmission housing and an apply hub which is actuated by an electric motor. A rotor is operatively connected to one of the planetary gear members and includes a portion extending between the floating caliper and the apply hub to enable selective braking of rotation of the rotor by frictionally engaging the portion of the rotor between the floating caliper and apply hub, thereby braking rotation of the planetary gear member.

Preferably, the frictional engagement of the rotor between the floating caliper and apply hub is provided by a plurality of friction pads. Also, the portion of the rotor which extends between the floating caliper and the apply hub is a plurality of radially extending plates which extend between a corresponding plurality of friction pad plates which are splined to the transmission housing and extend between the floating caliper and apply hub.

Also preferably, a drive screw assembly is rotatably driven by the electric motor and includes a first threaded portion threadedly engaged with the apply hub, and an oppositely threaded portion threadedly engaged with the floating caliper.

In one embodiment, the electric motor is positioned between the floating caliper and the apply hub for selectively moving the floating caliper and apply hub toward each other to frictionally engage the portion of the rotor which extends between the floating caliper and the apply hub.

A transmission in accordance with the invention may include multiple electric motor-actuated disc brake-type clutches for braking different planetary gear members. Also, a single planetary gear set within a transmission may have multiple electric motor-actuated disc brake-type braking clutches.

The braking clutch of the invention is intended to be used in any planetary or lay-shaft, automatic or manually-operated automotive transmission. The device is used in the shifting and braking of transmission gearing components for normal transmission operation.

The above aspects, objects and features and other aspects, objects and features of the invention are readily apparent from the following detailed description of the best modes for carrying out the invention when taken in connection with the accompanying drawings.

DESCRIPTION OF THE PREFERRED EMBODIMENT

Figure 1:
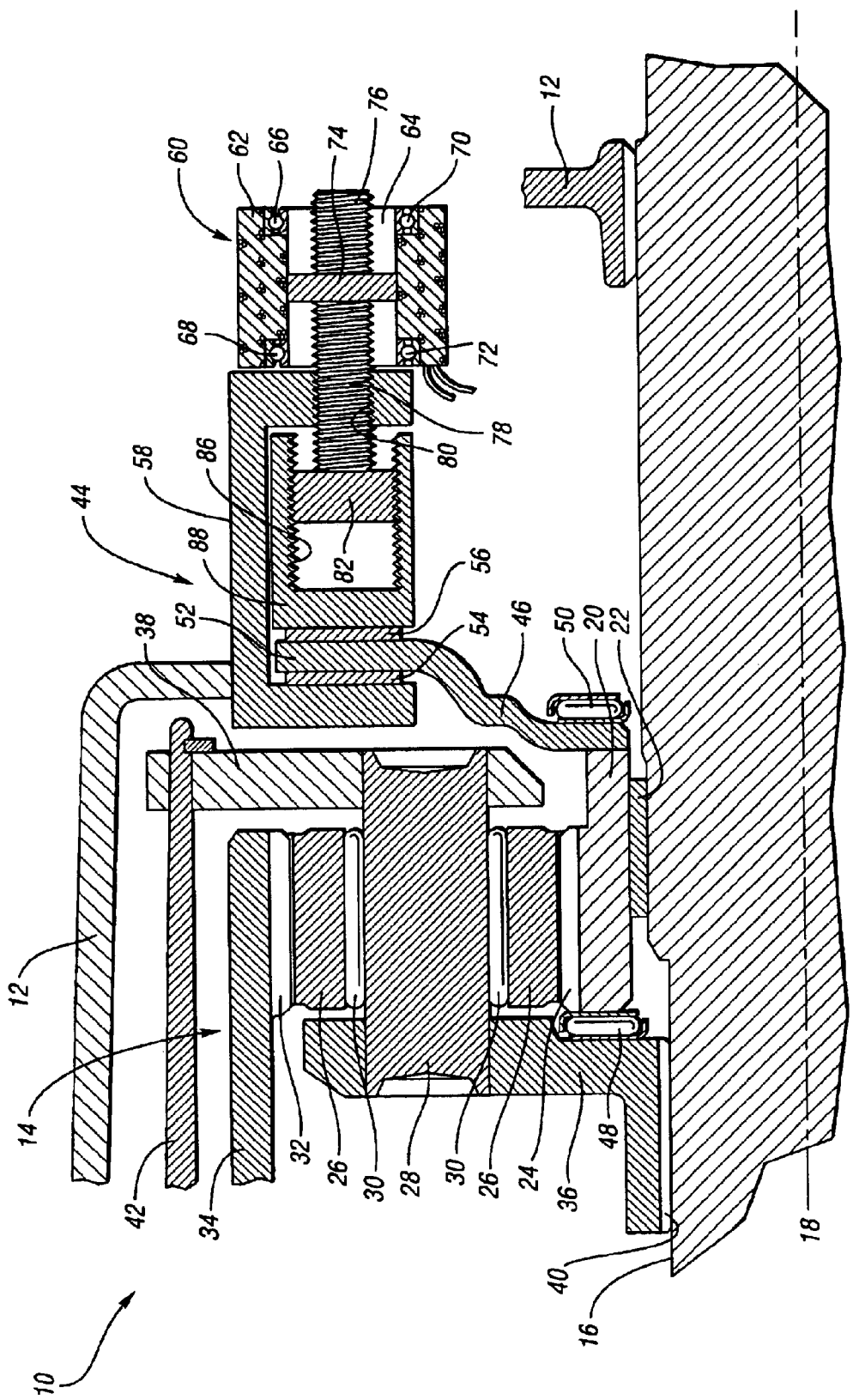
FIG. 1 shows a partial longitudinal cross-sectional view of a transmission assembly in accordance with the present invention.

FIG. 1 shows a partial longitudinal cross-sectional view of a transmission assembly 10 in accordance with the invention. The transmission assembly 10 includes a transmission housing 12 which encloses a planetary gear set 14, which is rotatably supported on a main shaft 16 having a central axis 18. The planetary gear set 14 includes a sun gear 20 which is supported on a bushing 22 and has teeth 24 engaged with pinion 26, which is supported on the pinion pin 28 by the roller bearings 30. The teeth 32 of the pinion 26 are engaged with inner teeth on a ring gear 34. The pinion pin 28 is supported by the planet carrier assembly members 36,38. The planet carrier assembly member 36 has teeth 40 which are splined to the main shaft 16. A hub 42 is connected to the planet carrier assembly member 38 and is rotationally driven by another transmission component.

The invention is particularly characterized by the braking clutch assembly 44. The braking clutch assembly 44 is configured to selectively brake rotation of the sun gear 20 with respect to the transmission housing 12. The sun gear 20 includes a rotor 46 connected thereto. The rotor 46 and sun gear 20 are supported axially on the main shaft 16 by the bearings 48, 50. The braking clutch assembly 44 is configured to brake rotation of the rotor 46 to thereby brake rotation of the sun gear 20.

The rotor 46 includes a radially extending portion 52 which forms a rotor plate which is positioned for braking by means of frictional engagement with the friction pads 54,56. The friction pads 54,56 are comprised of a transmission friction material which is configured to operate in a lubricated environment. Such materials are known in the transmission art.

The braking clutch assembly 44 further includes a floating caliper 58 which is movably supported on a transmission housing 12. The floating caliper 58 is supported with respect to the housing 12 in a manner to allow axial, back-and-forth sliding movement (to the left and right as viewed in FIG. 1). For example, the floating caliper 58 may be supported for sliding movement axially along a pair of bolts or guide rods which are fixed to the transmission housing by mounting flanges (not shown) and arranged parallel to the central axis 18.

An electric motor 60, which is fixed to floating caliper 58, includes windings 62 which drive the rotor 64, which is rotatably supported on the bearings 66,68,70,72. The rotor 64 includes an integral cross-pin 74 which passes through a hole in the drive bolt 76 to impart a torque on the drive bolt 76. The first portion 78 of the drive bolt 76 is threaded to the floating caliper 58 along the threaded aperture 80 of the floating caliper 58. The second portion 82 of the drive bolt 76 is oppositely threaded with respect to the first portion 78, and is threadedly engaged with the threads 86 of the apply hub 88.

Because the second portion 82 of the drive bolt 76 is oppositely threaded with respect to the first portion 78, rotation of the drive bolt 76 causes the floating caliper 58 to move in an opposite direction than the apply hub 88. Accordingly, if the drive bolt 76 is rotated to move the floating caliper 58 to the right as viewed in FIG. 1, the apply hub 88 would simultaneously move to the left as viewed in FIG. 1, thereby compressing the friction pads 54,56 against the radially extending portion 52 of the rotor 46 to brake rotation of the rotor 46, thereby braking rotation of the sun gear 20. Opposite rotation of the drive bolt 78 moves the floating caliper 58 and apply hub 88 away from the radially extending portion 52 of the rotor 46 to thereby release the rotor 46 to enable rotation of the sun gear 20.

Figure 2:
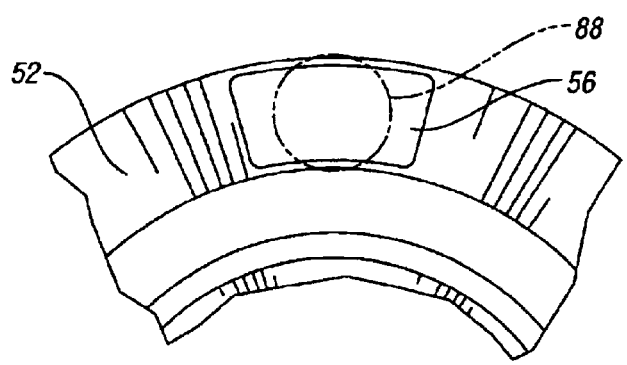
FIG. 2 shows a partial schematic end view of a rotor, friction pad and apply hub configuration in accordance with the embodiment of FIG. 1.

FIG. 2 is a partial schematic end view illustrating the engagement of the radially extending portion 52 of the rotor plate with the friction pad 56 and apply hub 88. FIGS. 1 and 2 are not necessarily to scale, but rather are enlarged to more clearly illustrate the invention.

Figure 3:
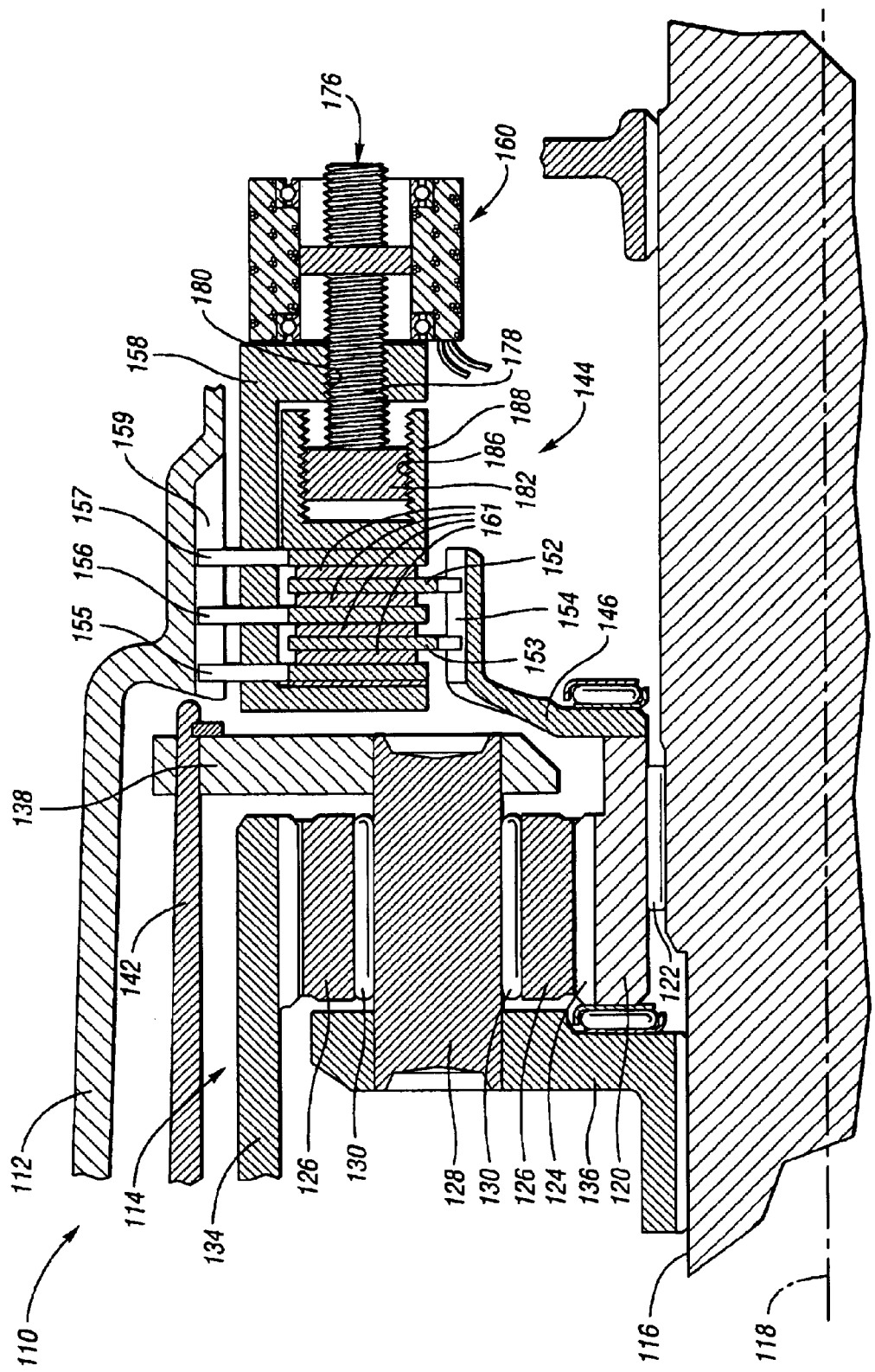
FIG. 3 shows a partial longitudinal cross-sectional view of a transmission assembly in accordance with a first alternative embodiment of the invention.

Turning to FIG. 3, a partial longitudinal cross-sectional view of a transmission in accordance with a first alternative embodiment of the invention is shown. The transmission assembly 110 includes a transmission housing 112 which encloses a planetary gear set 114, which rotates about a main shaft 116 having a central axis 118. The planetary gear set 114 includes a sun gear 120 rotatable on a bushing 122 and engaged with a pinion 126 at the teeth 124. A pinion pin 128 carries the pinion 126, and is supported by the planet carrier assembly members 136,138. The pinion 126 is engaged with the ring gear 134. The planet carrier assembly member 138 is connected to a hub 142.

As shown in FIG. 3, the first alternative embodiment is particularly characterized by the configuration of the braking clutch assembly 144.

As shown, a rotor 146 is connected to the sun gear 120, and includes radially extending plates 152,153, which are splined to the radial surface 154 of the rotor 146. Accordingly, the radially extending plates 152,153 are slidable axially along the radial surface 154 of the rotor 146. Friction pad plates 155,156,157 are splined to the transmission housing 112 at the spline surface 159 and support the friction pads 161. The friction pads 161 frictionally engage the radially extending plates 152, 153 with the friction pad plates 155,156,157 when the electric motor 160 is actuated to move the floating calliper 158 and apply hub 188 in a manner to compress the plates 152,153,155,156,157 as a result of rotatable engagement of the first and second portions 178,182 of the drive bolt 176 with the threads 180 and 186 of the floating caliper 158 and apply hub 188, similarly to the structure described with reference to FIGS. 1 and 2 above.

In this embodiment, the multiple plates 152,153,155,156, 157 can use a different friction materials which do not require high loading capacity. This flexibility may reduce costs and enhance shift feel.

Figure 4:
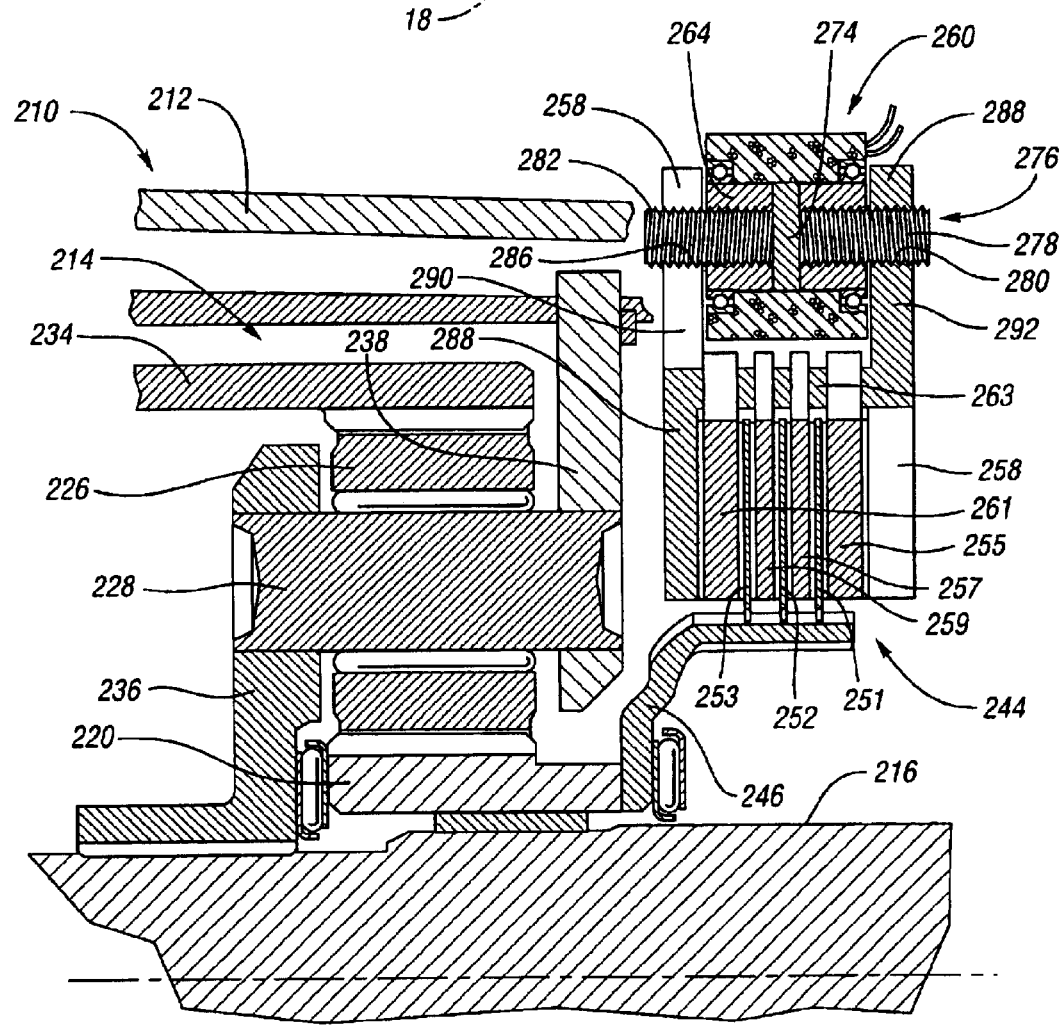
FIG. 4 shows a partial longitudinal cross-sectional view of a transmission assembly in accordance with a second alternative embodiment of the invention.

Referring to FIG. 4, a transmission assembly 210 is shown in accordance with a second alternative embodiment of the invention. As shown, the transmission assembly 210 includes a transmission housing 212 which encloses a planetary gear set 214, which is rotatable about a main shaft 216. The planetary gear set 214 includes a sun gear 220, a pinion 226, and a ring gear 234. The pinion 226 is supported by a pinion pin 228, which is carried by planet carrier assembly members 236 and 238.

The embodiment of the invention shown in FIG. 4 is particularly characterized by the configuration of the braking clutch assembly 244. As shown, a rotor 246 extends from the sun gear 220, and includes radially extending plates 251, 252,253 which are splined to the rotor 246. The plates 251,252,253 are compressed with the friction pad plates 255,257,259,261 to stop rotation of the sun gear 220 by frictional engagement of friction pads disposed between the plates 251,252,253,255, 257,259,261 when the floating calliper 258 and apply hub 288 are moved toward each other. As shown, the friction pad plates 255,257,259,261 are splined to the central portion 263 of the apply hub 288 for axial movement therealong to frictionally engage the plates 251, 252,253 when the drive motor 260 rotates the drive bolt 276. The radially extending plates 251,252,253 are preferably steel plates. The plates 255,257,259,261 are local pads which are splined to the apply hub 288, and do not extend around the main shaft 216.

As shown, the drive bolt 276 includes first and second oppositely threaded portions 278,282. The oppositely threaded first and second portions 278,282 of the drive bolt 276 are engaged with the threaded apertures 280,286, respectively, of the apply hub 288 and floating caliper 258.

The drive motor 260 is positioned between the radially outer portions 290,292 of the floating caliper 258 and apply hub 288, respectively. Actuation of the drive motor 260 rotates the armature 264 and cross-pin 274 to actuate the drive bolt 276. The floating caliper 258 and apply hub 288 are supported on the transmission housing 212 for axial sliding movement, but are not rotatable. By way of example, the floating caliper 258 and apply hub 288 could be supported by axially extending bolts on brackets which are mounted to the transmission housing 212 to allow such axial movement of these components 258,288 for engagement and disengagement of the braking clutch assembly 244.

Figure 5:
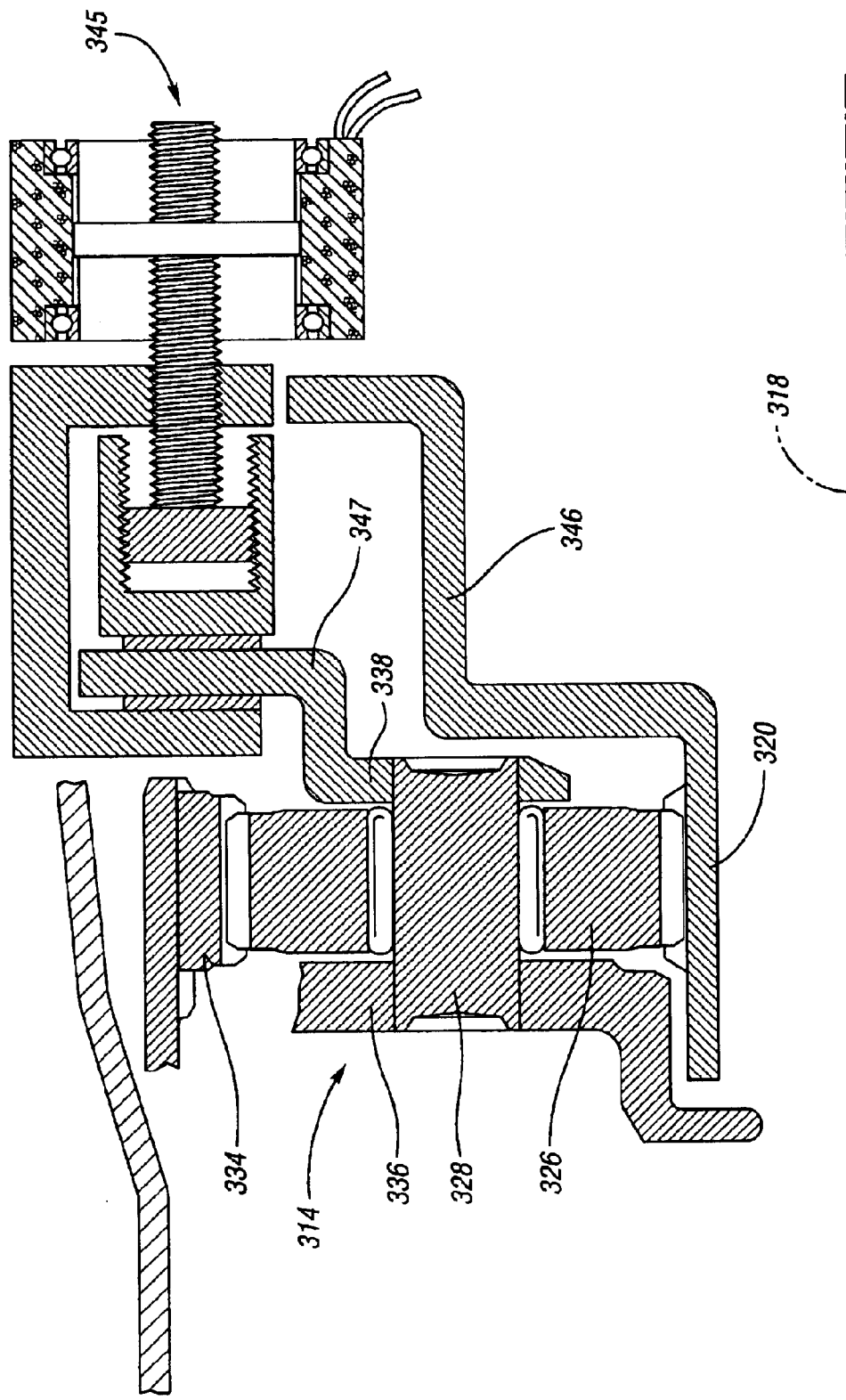
FIG. 5 shows a partial longitudinal cross-sectional view of a transmission assembly in accordance with a third alternative embodiment of the invention.
Figure 6:
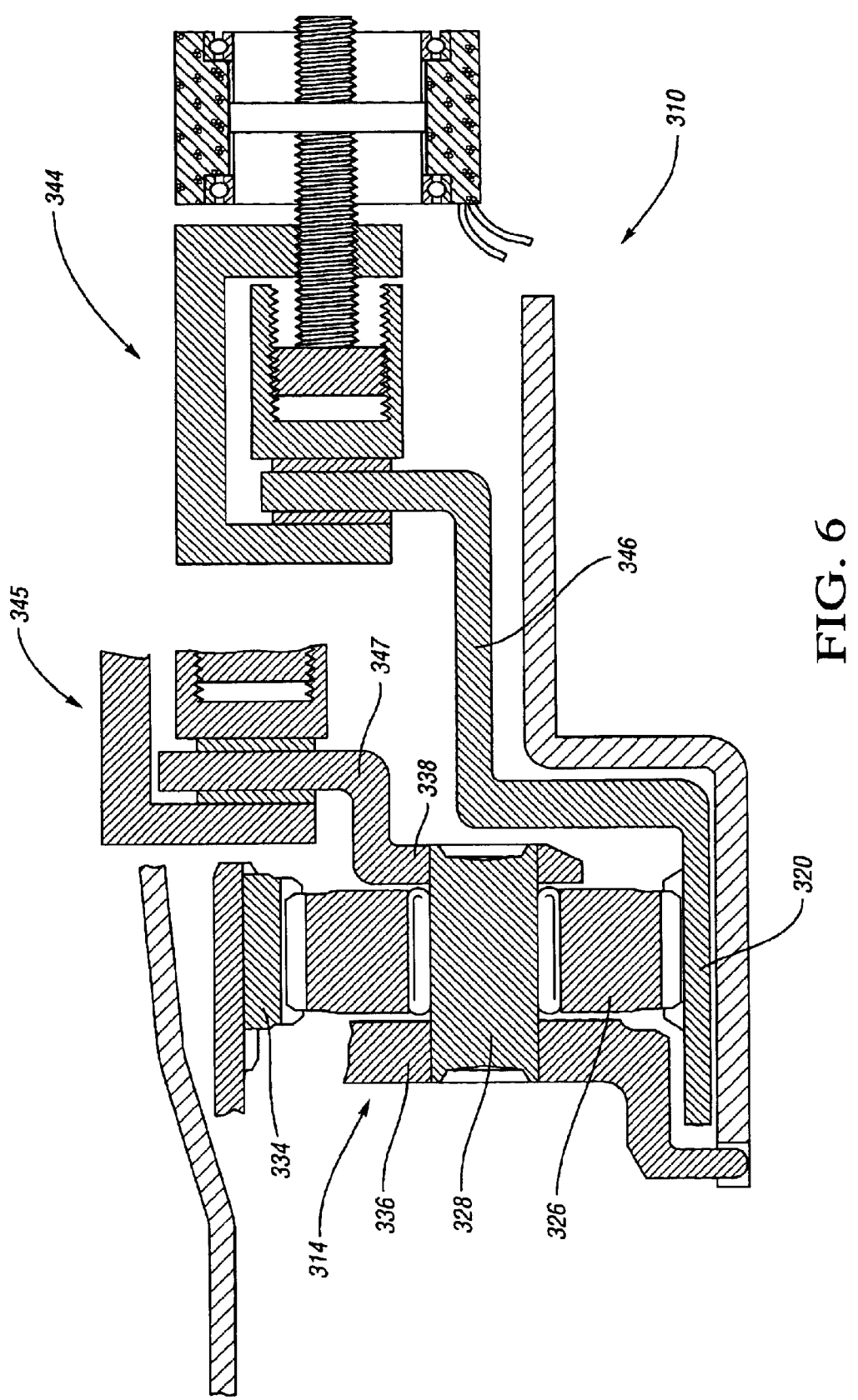
FIG. 6 shows a longitudinal cross-sectional view of the transmission assembly of FIG. 5, wherein the cross-section is radially rotated about the transmission axis with respect to the cross-section of FIG. 5.

FIGS. 5 and 6 show a transmission assembly 310 in accordance with a third alternative embodiment of the invention. In this embodiment, the planetary gear set 314 includes the sun gear 320, pinion 326, and ring gear 334. The pinion 326 is supported on the pinion pin 328, which is part of a planet carrier assembly 336,338. Rotors 346 and 347 are fixed to the sun gear 320 and carrier 338, respectively, for selectively braking rotation of the sun gear 320 and carrier 336,338 about the central axis 318 by actuation of the braking clutch assemblies 344,345. The braking clutch assemblies 344,345 are similar in structure and function to the braking clutch assembly 44 shown and described above with respect to FIG. 1. This description will not be repeated here. FIGS. 5 and 6 illustrate an embodiment in which two of the planetary gear members of the planetary gear set 314 can be selectively braked by means of the braking clutch assemblies 344,345.

The cross-sectional view shown in FIG. 6 is slightly rotated about the central axis 318 with respect to the cross-section of FIG. 5 to further illustrate the two braking clutch assemblies 344,345, which are slightly offset with respect to each other.

Figure 7:
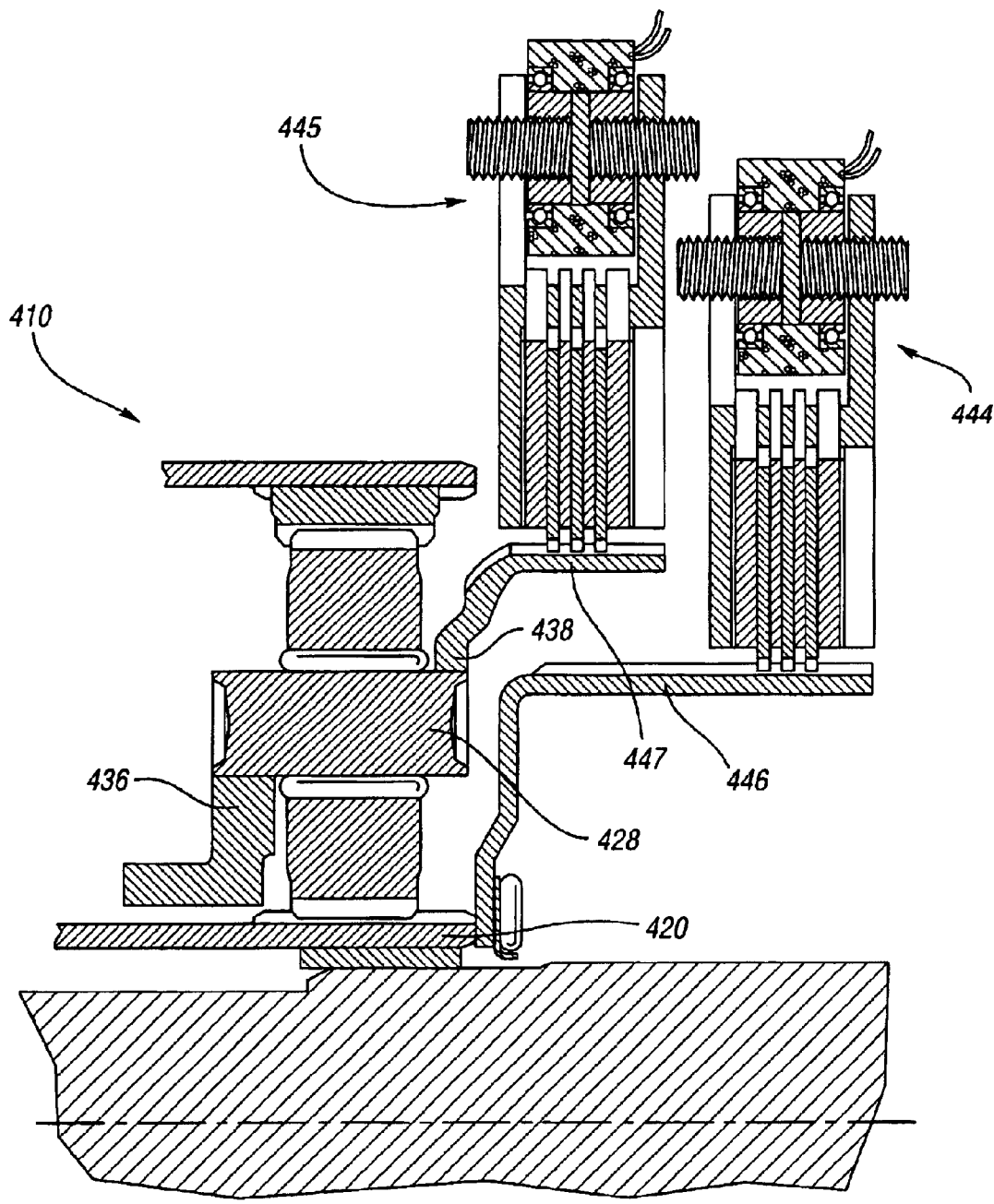
FIG. 7 shows a partial longitudinal cross-sectional view of a transmission assembly in accordance with a fourth alternative embodiment of the invention.

Similarly, FIG. 7 shows a fourth alternative embodiment in which braking clutch assemblies 444,445 may be implemented in the transmission assembly 410 to selectively brake rotation of the carrier 338 and sun gear 420 by engagement of the braking clutch assemblies 444,445. Rotors 446,447 extend from the sun gear 420 and carrier 338, respectively, for selective braking by the braking clutch assemblies 444,445. The braking clutch assemblies 444,445 are similar in structure and function to the embodiment described above with reference to FIG. 4. This description will not be repeated here.

While the best modes for carrying out the invention have been described in detail, those familiar with the art to which this invention relates will recognize various alternative designs and embodiments for practicing the invention within the scope of the appended claims.

What is claimed is:

1. A braking clutch for a transmission which includes a transmission housing and a plurality of planetary gear members, the braking clutch comprising:

a floating caliper movably support on the transmission housing;

an apply hub actuated by an electric motor;

a rotor operatively connected to one of the planetary gear members and having a portion extending between the floating caliper and the apply hub to enable selective braking of rotation of the rotor by frictionally engaging said portion of the rotor between the floating caliper and apply hub, thereby braking rotation of said one of the planetary gear members; and a drive screw assembly rotatably driven by the electric motor and threadedly engaged with the apply hub and with the floating caliper, wherein the drive screw assembly comprises a first threaded portion threadedly engaged with the apply hub and an oppositely threaded portion threadedly engaged with the floating caliper.

2. The braking clutch of claim 1, further comprising a plurality of friction pads configured to provide said frictional engagement between the rotor and the floating caliper and apply hub.

3. The braking clutch of claim 1, wherein said portion of the rotor comprises a plurality of radially extending plates which extend between a corresponding plurality of friction pad plates which are splined to the transmission housing and extend between the floating caliper and apply hub.

4. The braking clutch of claim 1, further comprising a plurality of said radially extending rotor plates which extend between a corresponding plurality of friction pad plates which are splined to the transmission housing and extend between the floating caliper and apply hub.

5. The braking clutch of claim 1, wherein said electric motor is positioned between the floating caliper and the apply hub for selectively moving the floating caliper and apply hub toward each other to frictionally engage said portion of the rotor.

6. A braking clutch for a transmission which includes a transmission housing and a plurality of planetary gear members, the braking clutch comprising:

a floating caliper movably supported with respect to the transmission housing;

an apply hub movable with respect to the floating caliper;

an electric motor operatively engaged with the apply hub for actuating the apply hub;

a rotor operatively connected to one of the planetary gear members and including a radially extending rotor plate extending between the floating caliper and the apply hub to enable selective braking of rotation of the rotor by frictional engagement of said rotor plate between the floating caliper and apply hub, thereby braking rotation of said one of the planetary gear members; and a drive screw assembly rotatably driven by the electric motor and having a first threaded portion threadedly engaged with the apply hub and an oppositely threaded portion threadedly engaged with the floating caliper.

7. The braking clutch of claim 6, further comprising a plurality of friction pads configured to provide said frictional engagement between the rotor plate and the floating caliper and apply hub.

8. The braking clutch of claim 6, wherein said electric motor is positioned between the floating caliper and the apply hub for selectively moving the floating caliper and apply hub toward each other to frictionally engaged said rotor plate.

9. A vehicle transmission comprising:

a transmission housing;

a plurality of planetary gear members;

a first braking clutch electrically actuated by a first electric motor to brake rotation of one of said planetary gear members;

a second braking clutch electrically actuated by a second electric motor for selectively braking rotation of another of said planetary gear members; and wherein each of said first and second braking clutches comprises: a floating caliper movably supported on the transmission housing; an apply hub actuated by the respective electric motor; and a drive screw assembly having a first threaded portion threadedly engaged with the floating caliper the an oppositely threaded portion threadedly engaged with the apply hub for actuating the braking clutches.

* * * * *